(12) United States Patent
Mori et al.

(10) Patent No.: US 11,782,201 B2
(45) Date of Patent: Oct. 10, 2023

(54) LIGHT GUIDE WITH MULTIPLE ROD-SHAPED LIGHT GUIDE PORTIONS ATTACHED TO EACH OTHER HAVING A PRISM SURFACE

(71) Applicant: TOYODA GOSEI CO., LTD., Kiyosu (JP)

(72) Inventors: Toshiaki Mori, Kiyosu (JP); Yoichi Matsuoka, Kiyosu (JP); Koichiro Endo, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/974,878

(22) Filed: Oct. 27, 2022

(65) Prior Publication Data
US 2023/0139776 A1    May 4, 2023

(30) Foreign Application Priority Data
Nov. 2, 2021   (JP) ................... 2021-179322

(51) Int. Cl.
  *F21V 8/00*   (2006.01)
  *B60Q 3/62*   (2017.01)
  *B60Q 3/10*   (2017.01)

(52) U.S. Cl.
  CPC ............ *G02B 6/0006* (2013.01); *B60Q 3/62* (2017.02); *B60Q 3/10* (2017.02)

(58) Field of Classification Search
  CPC .. G02B 6/0036; G02B 6/0006; G02B 6/0016; F21S 43/236; F21S 43/237
  See application file for complete search history.

(56) References Cited

U.S. PATENT DOCUMENTS 10,520,156 B2 * 12/2019 Ikuta ...................... F21S 41/30
10,605,979 B2 *  3/2020 Zietz .................. G02B 27/1006

FOREIGN PATENT DOCUMENTS

EP          2 584 249 B1       8/2017

* cited by examiner

Primary Examiner — Robert J May
(74) Attorney, Agent, or Firm — POSZ LAW GROUP, PLC

(57) ABSTRACT

A light guide includes a rod-shaped first light guide portion including a prism surface including a prism to reflect internally propagating light and output the light to an outside along a lengthwise direction thereof, a rod-shaped second light guide portion including a light intake portion to take in light from a light source, and a rod-shaped intermediate light guide portion between the first light guide portion and the second light guide portion provided such that side surfaces thereof are connected to side surfaces of the first light guide portion and the second light guide portion. A thickness of the intermediate light guide portion is smaller than a thickness of the first light guide portion and a thickness of the second light guide portion. A side surface of the intermediate light guide portion on a side of the prism surface is continuous with the prism surface in a same plane.

3 Claims, 4 Drawing Sheets

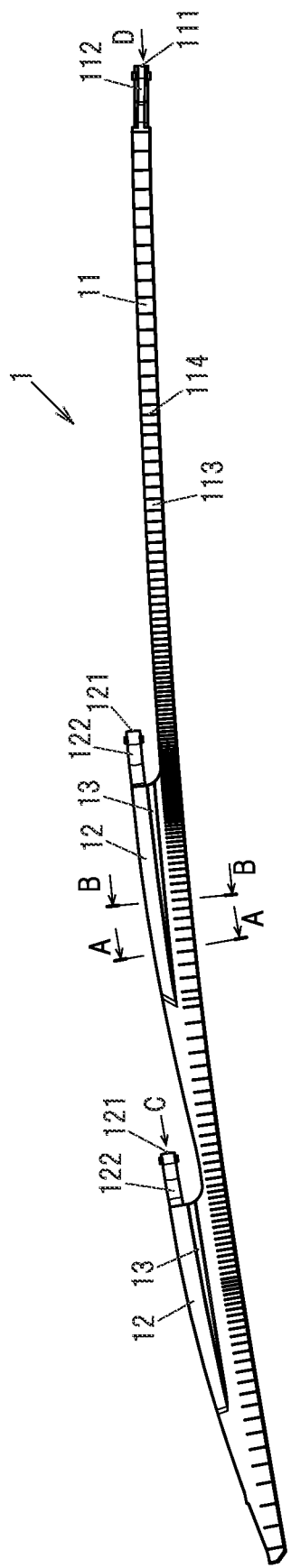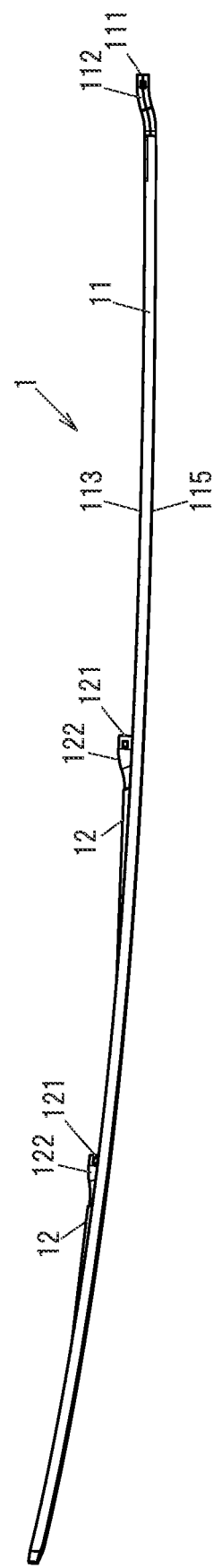

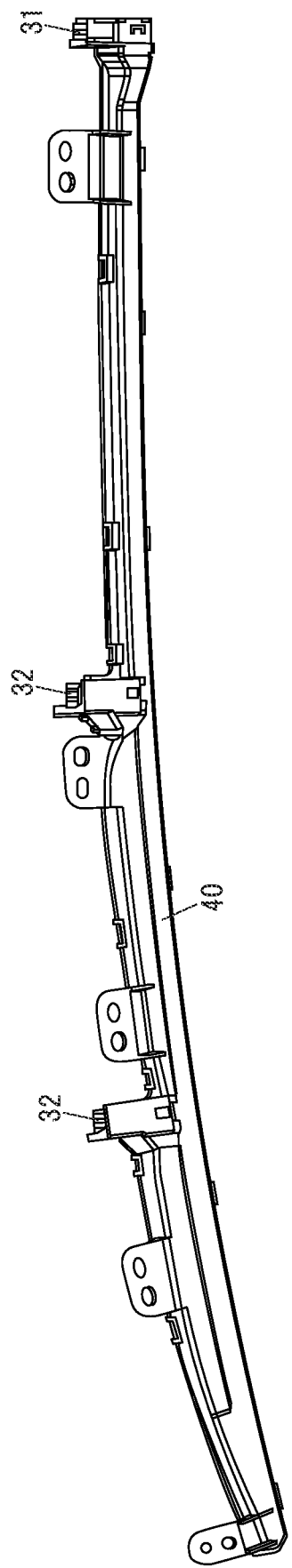

LIGHT GUIDE WITH MULTIPLE ROD-SHAPED LIGHT GUIDE PORTIONS ATTACHED TO EACH OTHER HAVING A PRISM SURFACE

CROSS-REFERENCE TO RELATED APPLICATIONS

The present patent application claims the priority of Japanese patent application No. 2021/179322 filed on Nov. 2, 2021, and the entire contents of Japanese patent application No. 2021/179322 are hereby incorporated by reference.

TECHNICAL FIELD

The present invention relates to a light guide and, in particular, to a light guide used in a vehicle interior lighting device.

BACKGROUND ART

A light guide is known in which two concentrically-arranged annular light guide portions are connected by an intermediate light guide position located therebetween (see Patent Literature 1). In the light guide described in Patent Literature 1, light entered from a light source into the inner annular light guide portion enters the outer annular light guide portion after passing through the intermediate light guide portion, and is then reflected at a prism and output to the outside. Thus, the light guide can be arranged in such a manner that only the outer annular light guide portion is exposed to the outside and the inner annular light guide portion and the light source are placed in a location not visible from the outside.

CITATION LIST

Patent Literature

Patent Literature 1: EP 2584249 B1

SUMMARY OF INVENTION

The light guide in Patent Literature 1 is configured such that a thickness (a width in vertical cross section) of the intermediate light guide portion is smaller than thicknesses of the two annular light guide portions, and the prism of the outer annular light guide portion is located on the outer side in a thickness direction of the intermediate light guide portion. Therefore, a problem may arise that light entering the outer annular light guide portion after passing through the intermediate light guide portion does not easily reach the prism, resulting in low light extraction efficiency.

It is an object of the invention to provide a light guide that can efficiently extract light entering a light guide portion with a prism surface after passing through an intermediate light guide through which two rod-shaped light guide portions are connected.

An aspect of the invention provides a light guide defined in (1) to (3) below.

(1) A light guide, comprising:
  a rod-shaped first light guide portion comprising a prism surface comprising a prism to reflect internally propagating light and output the light to an outside along a lengthwise direction thereof;
  a rod-shaped second light guide portion comprising a light intake portion to take in light from a light source; and
  a rod-shaped intermediate light guide portion between the first light guide portion and the second light guide portion provided such that side surfaces thereof are connected to side surfaces of the first light guide portion and the second light guide portion,
  wherein, in a direction orthogonal to a direction of alignment of the first light guide portion, the second light guide portion and the intermediate light guide portion, a thickness of the intermediate light guide portion is smaller than a thickness of the first light guide portion and a thickness of the second light guide portion, and
  wherein a side surface of the intermediate light guide portion on a side of the prism surface is continuous with the prism surface in a same plane.

(2) The light guide according to (1), wherein a side surface of the second light guide portion on the side of the prism surface comprises a surface that is inclined relative to the side surface of the intermediate light guide portion on the side of the prism surface and is continuous with the side surface of the intermediate light guide portion on the side of the prism surface.

(3) The light guide according to (1) or (2), wherein the first light guide portion comprises a light intake portion to take in light from a light source, wherein the light intake portion of the first light guide portion comprises a rod-shaped light guide with a polygonal shape in cross section perpendicular to the lengthwise direction, and wherein the light intake portion of the second light guide portion comprises a rod-shaped light guide with a circular shape in cross section perpendicular to the lengthwise direction.

Advantageous Effects of Invention

According to the invention, a light guide can be provided that can efficiently extract light entering a light guide portion with a prism surface after passing through an intermediate light guide through which two rod-shaped light guide portions are connected.

BRIEF DESCRIPTION OF DRAWINGS

FIGS. 2A and 2B are respectively side and bottom views showing the light guide in the embodiment of the invention.

FIG. 5 is a diagram illustrating a state when light sources to supply light to the light guide and a housing to house the light guide are attached to the light guide in the embodiment of the invention.

DESCRIPTION OF EMBODIMENTS

Embodiment

A light guide 1 in the embodiment of the invention is a light guide used in a vehicle interior lighting device. The installation location of the light guide 1 in the vehicle cabin is not specifically limited, but it is typically installed on an instrument panel. Light emitted from the light guide 1 may be used for direct lighting or may be used for indirect lighting.

Figure 1:
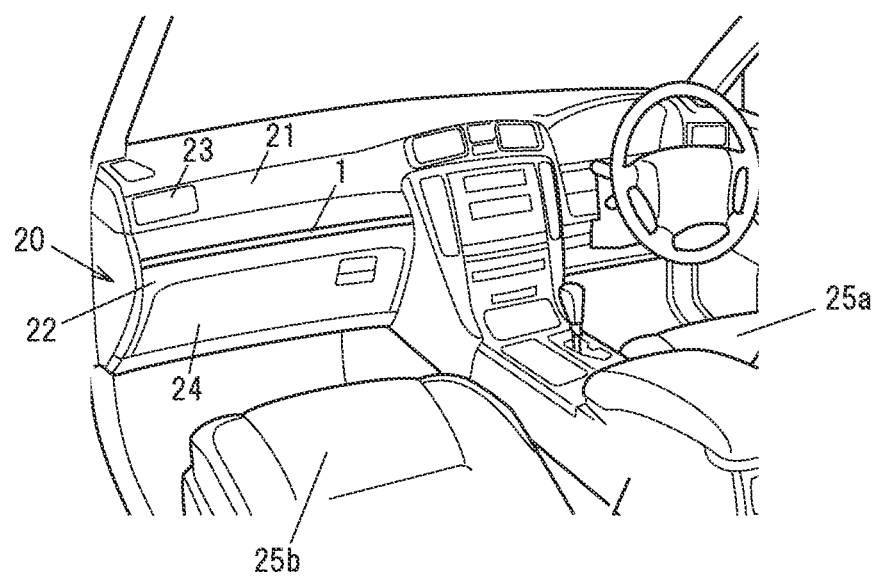
FIG. 1 is a schematic diagram illustrating a vehicle cabin around an instrument panel, which is an example of an installation location of a light guide in an embodiment of the present invention.

FIG. 1 is a schematic diagram illustrating a vehicle cabin around an instrument panel 20, which is an example of an installation location of the light guide 1. The instrument panel 20 is a vehicle interior part which is arranged on the front side of seats 25 (a driver's seat 25a, a front passenger seat 25b) and on which vehicle meters and gauges and air conditioner vents, etc., are provided. The instrument panel 20 has an upper panel 21 constituting an upper portion thereof, and a lower panel 22 constituting a lower portion. For example, a glove compartment 24, etc., is provided on the lower panel 22 in front of the front passenger seat, and an air conditioner vent 23, etc., is provided on the upper panel 21.

In the example shown in FIG. 1, the light guide 1 is placed on a design surface of the instrument panel 20 and light emitted from the light guide 1 is used for direct lighting to be directly visually perceived by occupants sitting in the seats 25. In this regard, the light guide 1 may not be exposed on the design surface of the instrument panel 20, and may be placed behind an outer lens provided on the design surface.

The light guide 1 may alternatively be placed, e.g., inside a space (a gap) provided between the upper panel 21 of the instrument panel 20 and the lower panel 22 located thereunder. In this case, light emitted from the light guide 1 is used for indirect lighting and is visually perceived by the occupants sitting in the seats 25 after being reflected at an upper surface of the lower panel 22.

FIGS. 2A and 2B are respectively side and bottom views showing the light guide 1. The light guide 1 has a rod-shaped first light guide portion 11 having a prism surface 113 which extends along a lengthwise direction thereof and on which a prism 114 to reflect internally propagating light and output the light to the outside is provided, a rod-shaped second light guide portion 12 having a light intake portion 122 to take in light from a light source, and a rod-shaped intermediate light guide portion 13 provided between the first light guide portion 11 and the second light guide portion 12 so that side surfaces thereof are connected to side surfaces of the first light guide portion 11 and the second light guide portion 12. In this regard, the "side surfaces" of the first light guide portion 11, the second light guide portion 12 and the intermediate light guide portion 13 mean side surfaces of rod-shaped objects (surfaces along the lengthwise direction).

The prism 114 is composed of, e.g., a group of linear grooves which are aligned on the prism surface 113 and each extends along a direction orthogonal to the lengthwise direction of the light guide 1. The linear grooves constituting the prism 114 are, e.g., straight grooves having a V-shaped cross section. Alternatively, the prism 114 may be composed of a group of linear protrusions, in place of the group of linear grooves. The linear protrusions in this case are, e.g., straight protrusions having a triangular cross section. Arrangement and intervals (pitch) of the linear groove group, etc., constituting the prism 114 are set according to a light introduction path so that uniformity of light extracted from the first light guide portion 11 is increased.

Light emitted from the light source enters through a light intake surface 121 into the second light guide portion 12, enters the first light guide portion 11 after passing through the intermediate light guide portion 13, and is then reflected at the prism 114 and output to the outside from a surface 115 of the first light guide portion 11 located opposite to the prism surface 113.

By using the second light guide portion 12 and the intermediate light guide portion 13 in this manner, it is possible to supply light from the middle portion of the first light guide portion 11, not from lengthwise ends. This can reduce a distance between a light extraction portion of the first light guide portion 11 and the light source even when the first light guide portion 11 is long. Therefore, when, e.g., RGB lights are supplied from the light source, it is possible to suppress unevenness in color of extracted light which is caused by the fast attenuation rate of blue light.

The light intake portion 122 of the second light guide portion 12 is, e.g., a rod-shaped light guide extending from a lengthwise end of a main body connected to the intermediate light guide portion 13, as shown in FIGS. 2A and 2B. In this case, a lengthwise end face of the light intake portion 122 serves as the light intake surface 121.

Figure 3A:
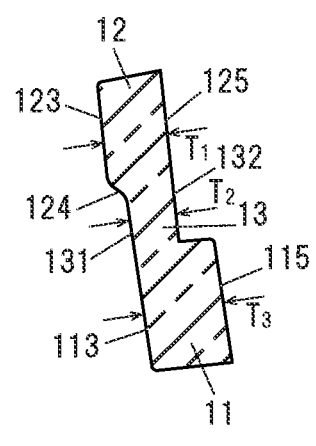
FIGS. 3A and 3B are cross-sectional views showing cross sections of the light guide in the embodiment of the invention respectively cut along lines A-A and B-B shown in FIG. 2A.
Figure 3B:
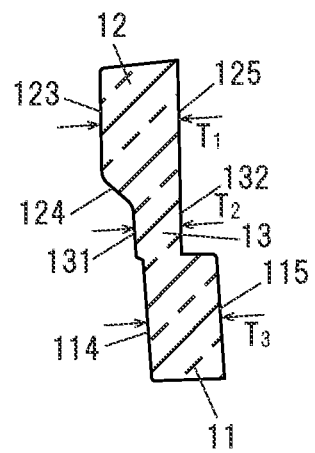

FIGS. 3A and 3B are cross-sectional views of the light guide 1 cut along lines A-A and B-B, respectively, in FIG. 2A. FIG. 3A shows a cross section not including the prism 114 of the first light guide portion 11, and FIG. 3A shows a cross section including the prism 114 of the first light guide portion 11.

Here, when a width of the first light guide portion 11, the second light guide portion 12 and the intermediate light guide portion 13 in a direction orthogonal to a direction of alignment of the first light guide portion 11, the second light guide portion 12 and the intermediate light guide portion 13 is defined as a thickness, a thickness $T_3$ of the intermediate light guide portion 13 is smaller than a thickness $T_1$ of the first light guide portion 11 and a thickness $T_2$ of the second light guide portion 12. This causes many reflections to occur inside the intermediate light guide portion 13 and allows light to quickly reach the first light guide portion 11.

In addition, a side surface 131 of the intermediate light guide portion 13 on the prism surface 113 side is continuous with the prism surface 113 in the same plane, as shown in FIGS. 3A and 3B. Light entered from the intermediate light guide portion 13 into the first light guide portion 11 thereby easily reaches the prism 114, which increases light extraction efficiency. In addition, since light easily reaches the prism 114, uniformity of brightness of light extracted from the first light guide portion 11 is enhanced.

In addition, a side surface 123 of the second light guide portion 12 on the prism surface 113 side has a flat surface 124 that is inclined relative to the side surface 131 of the intermediate light guide portion 13 on the prism surface 113 side and is continuous with the side surface 131, as shown in FIGS. 3A and 3B. In this case, the intermediate light guide portion 13 has a shape which is narrowed with respect to the second light guide portion 12 on the prism surface 113 side. This allows light propagating in the second light guide portion pipe 12 to efficiently advance into the intermediate light guide portion 13.

In the light guide described in Patent Literature 1 (European Patent No. 2584249, Specification) mentioned above, the light guide portion corresponding to the second light guide portion 12 is a light guide having a circular cross section and is configured such that its side surface continuous with a side surface of the intermediate light guide portion is a curved surface. In the light guide 1, having the flat surface 124 allows light to advance from the second light guide portion 12 into the intermediate light guide portion 13 more efficiently as compared to when having a curved surface as provided on the light guide described in Patent Literature 1 instead of having the flat surface 124.

An angle of the flat surface 124 of the second light guide portion 12 relative to the side surface 131 of the intermediate light guide portion 13 is in a range of, e.g., more than 0° and less than 90°, preferably in a range of not less than 30° and not more than 60°. End portions of the flat surface 124 (a boundary with a non-inclined portion of the side surface 123 and a boundary with the side surface 131) may be curved, i.e., may have an R-shape.

In the example shown in FIGS. 3A and 3B, the first light guide portion 11 and the intermediate light guide portion 13 have rectangular shapes in cross section perpendicular to the lengthwise direction, and the second light guide portion 12 having the flat surface 124 inclined relative to the side surface 131 of the intermediate light guide portion 13 has a pentagonal shape in cross section perpendicular to the lengthwise direction.

The first light guide portion 11, the second light guide portion 12 and the intermediate light guide portion 13 are formed of a material which can transmit visible light emitted from the light source, such as clear acrylic. The light guide 1 is usually formed by injection molding, etc., and first light guide portion 11, the second light guide portion 12 and the intermediate light guide portion 13 are formed in one piece.

In addition, in FIGS. 3A and 3B, a side surface 125 of the second light guide portion 12 located on the light extraction side and a side surface 132 of the intermediate light guide portion 13 located on the light extraction side are continuous in the same plane. However, the side surface 125 may have a flat surface that is inclined relative to the side surface 132 and is continuous with the side surface 132 in the same manner as the flat surface 124 on the side surface 123 side. That is, the intermediate light guide portion 13 may have a shape which is narrowed with respect to the second light guide portion 12 on both sides.

The first light guide portion 11 preferably has a light intake portion 112 at its longitudinal end to take in light from the light source, as shown in FIGS. 2A and 2B. As a result, light from the light source can be taken in from both the light intake portion 112 and the light intake portion 122 of the second light guide portion 12, hence, brightness of light extracted from the first light guide portion 11 and uniformity of the brightness can be improved.

The light intake portion 112 of the first light guide portion 11 is, e.g., a rod-shaped light guide extending from a lengthwise end of a main body having the prism 114 of the first light guide portion 11, as shown in FIGS. 2A and 2B. In this case, a lengthwise end face of the light intake portion 112 serves as a light intake surface 111.

The light guide 1 preferably includes plural second light guide portions 12 to improve brightness of light extracted from the first light guide portion 11 and uniformity of the brightness. In the example shown in FIGS. 2A and 2B, the light guide 1 includes two second light guide portions 12.

Figure 4A:
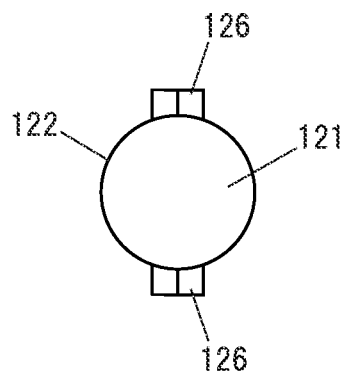
FIG. 4A is a diagram illustrating a light intake surface of a second light guide portion when viewed in a direction indicated by an arrow C shown in FIG. 2A.
Figure 4B:
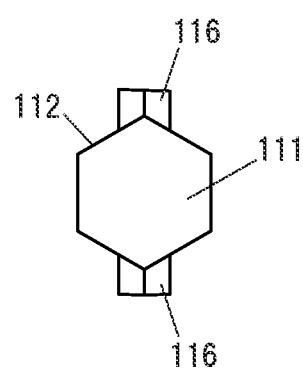
FIG. 4B is a diagram illustrating a light intake surface of a first light guide portion when viewed in a direction indicated by an arrow D shown in FIG. 2A.

FIG. 4A is a diagram illustrating the light intake surface 121 of the second light guide portion 12 when viewed in a direction indicated by the arrow C shown in FIG. 2A, and FIG. 4B is a diagram illustrating the light intake surface 111 of the first light guide portion 11 when viewed in a direction indicated by the arrow D shown in FIG. 2A.

The shape of the light intake portion 112 of the first light guide portion 11 in cross section perpendicular to the lengthwise direction is preferably polygonal such as hexagon, rectangular or triable, as is the shape of the light intake surface 111 shown in FIG. 4B.

When lights with different colors, such as red, green and blue (RGB), are taken in from the light source through the light intake surface 111, the lights may not be mixed sufficiently in the light intake portion 112, resulting in unevenness in color of light that is extracted from the main body having the prism 114 of the first light guide portion 11 in a region close to the light intake portion 112. Thus, the light intake portion 112 is formed to have a polygonal shape in cross section perpendicular to the lengthwise direction so that the lights are diffusely reflected and easily mixed in the light intake portion 112, thereby suppressing unevenness in color as compared to when the light intake portion 112 has a circular shape in cross section perpendicular to the lengthwise direction.

On the other hand, the shape of the light intake portion 122 of the second light guide portion 12 in cross section perpendicular to the lengthwise direction is preferably circular (including ellipse) as is the shape of the light intake surface 121 shown in FIG. 4A.

When the light intake portion 122 of the second light guide portion 12 has a circular shape in cross section perpendicular to the lengthwise direction, light loss in the second light guide portion 12 is lower than when the light intake portion 122 has a polygonal shape. In addition, light taken in from the light source through the light intake surface 121 reaches the first light guide portion 11 after passing through the second light guide portion 12 and the intermediate light guide portion 13. Therefore, even when lights with different colors are taken in from the light source through the light intake surface 121, the lights are mixed sufficiently before reaching the first light guide portion 11. Therefore, unevenness in color of the extracted light does not occur even though light intake portion 122 of the second light guide portion 12 has a circular shape in cross section perpendicular to the lengthwise direction.

FIG. 5 is a diagram illustrating a state when light sources 31, 32 to supply light to the light guide 1 and a housing 40 to house the light guide 1 are attached to the light guide 1. Here, the light source 31 supplies light to the light intake portion 112 of the light guide 1 and the light sources 32 supply light to the light intake portions 122 of the light guide 1 For example, the light guide 1 and the light sources 31, 32 are each fixed to the housing 40, and the light guide 1 and the light sources 31, 32 and the housing 40 constitute a lighting device used in vehicle interior, etc.

The light source to supply light to the light guide 1 is typically a light-emitting device that includes a light-emitting element such as LED. The light-emitting element included in the light-emitting device is, e.g., an LED called a full-color LED having three LEDs of red, green and blue colors in one package, and in this case, light of a desired color can be emitted by, e.g., PWM control from an in-vehicle ECU (Electronic Control Unit) through an in-vehicle network.

Protrusions 116 provided on the light intake portion 112 of the first light guide portion 11 and protrusions 126 provided on the light intake portion 122 of the second light guide portion 12 are used to fix the light guide 1 to the housing 40 and are fitted to, e.g., grooves provided on the housing 40.

(Effects of the Embodiment)

In the light guide 1 in the embodiment of the invention described above, the side surface 131 of the intermediate light guide portion 13 on the prism surface 113 side is continuous with the prism surface 113 in the same plane. Therefore, light entered from the intermediate light guide portion 13 into the first light guide portion 11 easily reaches the prism 114 and light can thus be extracted efficiently. In addition, since light easily reaches the prism 114, uniformity of brightness of light extracted from the first light guide portion 11 is enhanced.

Although the embodiment of the invention has been described, the invention is not limited to the embodiment described above and the various kinds of modifications can be implemented without departing from the gist of the invention. In addition, the constituent elements in the embodiment can be arbitrarily combined without departing from the gist of the invention.

In addition, the embodiment described above does not limit the invention according to claims. Further, please note that not all combinations of the features described in the embodiment are necessary to solve the problem of the invention.

REFERENCE SIGNS LIST

1 LIGHT GUIDE
11 FIRST LIGHT GUIDE PORTION
112 LIGHT INTAKE PORTION
113 PRISM SURFACE
114 PRISM
12 SECOND LIGHT GUIDE PORTION
122 LIGHT INTAKE PORTION
124 FLAT SURFACE
13 INTERMEDIATE LIGHT GUIDE PORTION
131 SIDE SURFACE

The invention claimed is:

1. A light guide, comprising:
a rod-shaped first light guide portion comprising a prism surface comprising a prism to reflect internally propagating light and output the light to an outside along a lengthwise direction thereof;
a rod-shaped second light guide portion comprising a light intake portion to take in light from a light source; and
a rod-shaped intermediate light guide portion between the first light guide portion and the second light guide portion provided such that side surfaces thereof are connected to side surfaces of the first light guide portion and the second light guide portion,
wherein, in a direction orthogonal to a direction of alignment of the first light guide portion, the second light guide portion and the intermediate light guide portion, a thickness of the intermediate light guide portion is smaller than a thickness of the first light guide portion and a thickness of the second light guide portion, and
wherein a side surface of the intermediate light guide portion on a side of the prism surface is continuous with the prism surface in a same plane.

2. The light guide according to claim 1, wherein a side surface of the second light guide portion on the side of the prism surface comprises a surface that is inclined relative to the side surface of the intermediate light guide portion on the side of the prism surface and is continuous with the side surface of the intermediate light guide portion on the side of the prism surface.

3. The light guide according to claim 1, wherein the first light guide portion comprises a light intake portion to take in light from a light source, wherein the light intake portion of the first light guide portion comprises a rod-shaped light guide with a polygonal shape in cross section perpendicular to the lengthwise direction, and wherein the light intake portion of the second light guide portion comprises a rod-shaped light guide with a circular shape in cross section perpendicular to the lengthwise direction.

* * * * *